US012783644B2

(12) United States Patent
Das

(10) Patent No.: US 12,783,644 B2
(45) Date of Patent: Nov. 3, 2026

(54) LOG EVENT GENERATION USING TEMPLATE SCHEMAS AND RELATED SYSTEMS AND METHODS

(71) Applicant: Oracle International Corporation, Redwood Shores, CA (US)

(72) Inventor: Sreeji Krishnan Das, Fremont, CA (US)

(73) Assignee: Oracle International Corporation, Redwood Shores, CA (US)

( * ) Notice: Subject to any disclaimer, the term of this patent is extended or adjusted under 35 U.S.C. 154(b) by 138 days.

(21) Appl. No.: 18/826,894

(22) Filed: Sep. 6, 2024

(65) Prior Publication Data

US 2026/0073040 A1 Mar. 12, 2026

(51) Int. Cl.
*G06F 21/00* (2013.01)
*G06F 21/55* (2013.01)

(52) U.S. Cl.
CPC ...... *G06F 21/552* (2013.01); *G06F 2221/034* (2013.01)

(58) Field of Classification Search
CPC ......................... G06F 2221/034; G06F 21/552
USPC ............................................................ 726/23
See application file for complete search history.

(56) References Cited

U.S. PATENT DOCUMENTS

| | | | | |
|---|---|---|---|---|
| 12,452,279 | B1 * | 10/2025 | Reed | G06F 16/9024 |
| 2019/0065241 | A1 * | 2/2019 | Wong | G06F 11/0721 |
| 2025/0219894 | A1 * | 7/2025 | Gupta | H04L 41/0613 |
| 2025/0247400 | A1 * | 7/2025 | Verma | H04L 63/1416 |

* cited by examiner

*Primary Examiner* — Josnel Jeudy
(74) *Attorney, Agent, or Firm* — Invoke

(57) ABSTRACT

Techniques for generating simulated log events are disclosed herein. Simulated log events are generated using schemas for templates determined according to a variable parameter for the template. The templates correspond to different clients, request types associated with the simulated event, and/or servers within an organization for which events are logged. For a particular template corresponding to a client role and request type, the schemas provide rules and/or schedules for determining sequences of one or more events according to event type, timestamp, and/or other event details. The sequences of events are visualized by a logging analytics service. Schemas are manually defined or automatically determined. Organization event logs are ingested by the system to identify templates and/or schemas for the organization which are used to simulate log events for the organization.

20 Claims, 6 Drawing Sheets

LOG EVENT GENERATION USING TEMPLATE SCHEMAS AND RELATED SYSTEMS AND METHODS

TECHNICAL FIELD

The present disclosure relates to techniques for generating a log event by applying a schema to assign one or more values to a template used to simulate a log event. Log events are combined into an event log usable with a logging analytics system.

BACKGROUND

Logging analytics (LA) systems are tools or platforms used to collect, analyze, and visualize log data generated by various other systems, applications, and devices. LA systems enables organizations to monitor, troubleshoot, and optimize their operations by providing insights derived from event logs. Event logs, which are records capturing activities or events within a system, typically contain details such as timestamps, event types (e.g., errors, warnings, or informational messages), the source of the event, and additional contextual data that helps in understanding the event's nature. For instance, when a user logs into a system, the event log might record the username, login time, and IP address of the device used. Similarly, if an application encounters an error, the event log would document the error message, the time it occurred, and possibly a trace of the code or process involved.

Event logs are useful for various reasons using LA. For example, event logs are useful for troubleshooting and debugging systems, security monitoring, forensic analysis, etc. However, event log data is not always available for LA. Missing or incomplete logs can result in problems such as incomplete analysis, skewed results, incorrect conclusions, or missed insights. Lack of event logs can delay troubleshooting, making diagnosing and fixing issues more challenging and time-consuming.

Techniques in this disclosure may address any of the aforementioned flaws, challenges, and difficulties by providing techniques that result in improved security for model output. The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

BRIEF DESCRIPTION OF THE DRAWINGS

The embodiments are illustrated by way of example and not by way of limitation in the figures of the accompanying drawings. It should be noted that references to "an" or "one" embodiment in this disclosure are not necessarily to the same embodiment, and they mean at least one. In the drawings.

DETAILED DESCRIPTION

Figure 1:
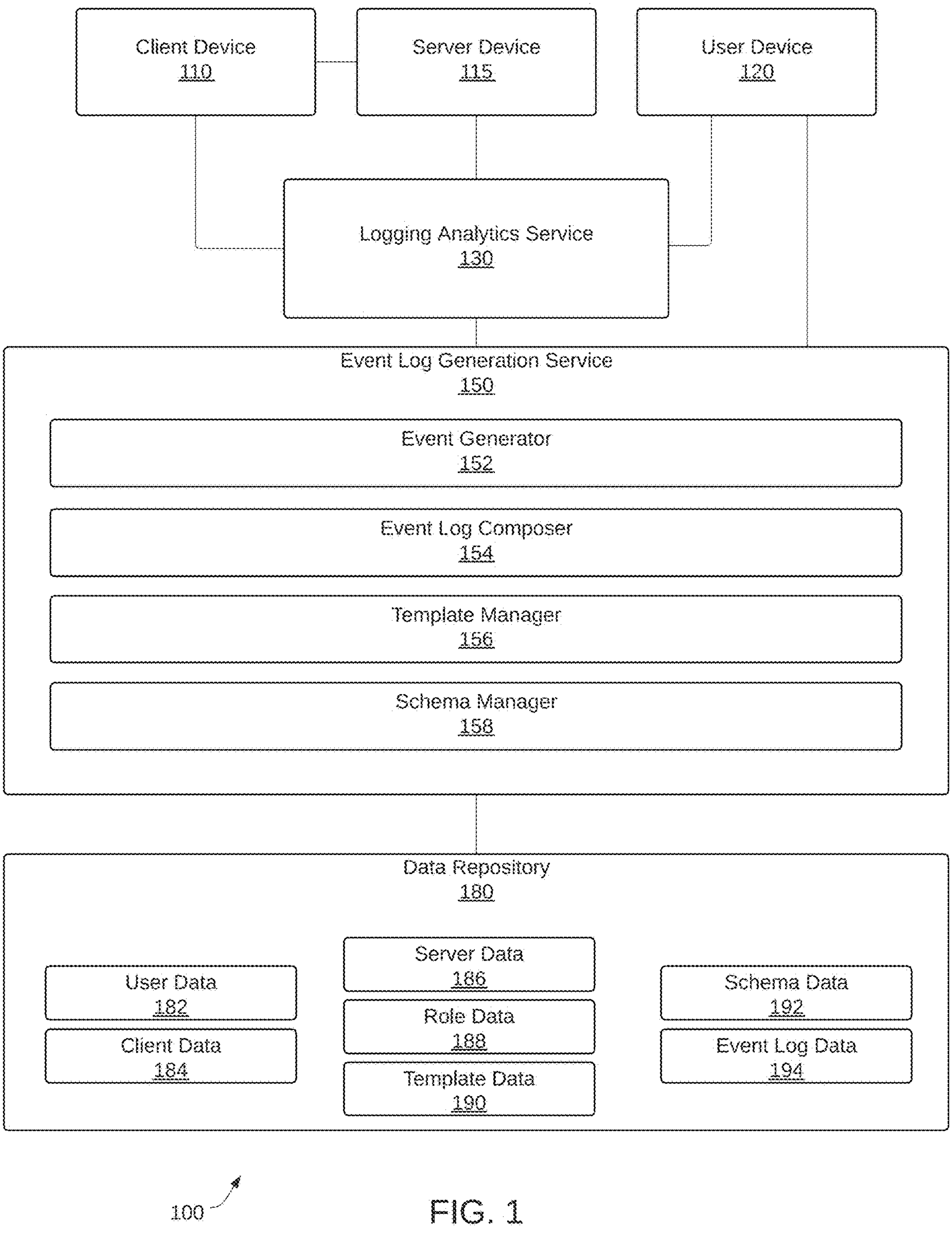
FIG. 1 illustrates an example log event generation system in accordance with one or more embodiments.

In the following description, for the purposes of explanation, numerous specific details are set forth to provide a thorough understanding. One or more embodiments may be practiced without these specific details. Features described in one embodiment may be combined with features described in a different embodiment. In some examples, well-known structures and devices are described with reference to a block diagram form to avoid unnecessarily obscuring the present disclosure.

1. GENERAL OVERVIEW
2. LOG EVENT GENERATION SYSTEM
3. OPERATIONS FOR GENERATING LOG EVENTS
4. EXAMPLE LOG EVENT GENERATION SYSTEM TECHNIQUES
5. COMPUTER NETWORKS AND CLOUD NETWORKS
6. MICROSERVICE APPLICATIONS
7. HARDWARE OVERVIEW
8. MISCELLANEOUS; EXTENSIONS

1. General Overview

One or more embodiments provide techniques for generating log events for logging analytics (LA) systems. The log events are generated using templates and schemas for the templates and aggregated into event logs. Further, templates and/or schemas are identified by ingested event data.

Logging analytics is the process of collecting, analyzing, and interpreting log data generated by software applications, networks, and other systems to gain insights into their performance, security, and behavior. This data, stored in event logs, serves as a record of all activities, transactions, and changes occurring within an IT environment. By leveraging logging analytics, organizations can identify patterns, detect anomalies, troubleshoot issues, and enhance overall system reliability. The process involves aggregating log data, including data from multiple sources, and using tools and algorithms to filter, correlate, and/or visualize the information in a way that supports decision-making and problem-solving.

An event log is a sequential record of events, typically maintained by an operating system or application, which captures various actions or occurrences within the system. Each entry in an event log is known as a log event, which can range from simple actions like user logins to more complex activities such as software updates or security breaches. In large organizations, there can be many types of events corresponding to different roles, systems, and applications, making it challenging to create realistic logs that accurately reflect the complexity of the organization. The diverse nature of events, varying formats, and the sheer volume of data involved add to the difficulty of generating logs that are both comprehensive and meaningful for analysis. As a result, realistic log creation requires careful consideration of the organization's structure, processes, and potential scenarios to ensure that the logs are representative of the actual environment.

To facilitate the creation of realistic logs, the system identifies a set of templates for an organization. The system selects one or more schemas to determine values used for completing the templates. The schemas and/or templates contain static values and/or variable values that are algorithmically or randomly generated. Schemas are used to provide values to generate an event, or a sequence of event, using an event template. The sequences of events are stored with other sequences of events in an event log. In this way, the system applies the schemas to the event templates to generate realistic sequences of events.

The system provides templates for users and/or roles within an organization are provided for one or more default organization structures. For example, an organization includes one or more client types, one or more server types, and one or more roles indicating a relationship between a particular client and a particular server. Templates for one or more default organizations are stored by the system. The templates include structure mirroring organizations'groups, group memberships, entities, relationships between entities, and/or other features related to events occurring within the environment of the organization.

In embodiments, the system identifies templates for an event log or other event data ingested by the system. The identified templates are stored in a template database or other data storage. For a particular template, the system provides one or more schemas. Various schemas include variable parameters and/or static parameters. The parameters define one or more values for the system when the system applies a template to generate a log event.

Applicant notes that this Overview is non-limiting in nature, and that additional embodiments and related combinations of features are described in this Specification and/or recited in the claims.

2. Log Event Generation System

FIG. 1 illustrates a log event generation system 100 in accordance with one or more embodiments. In FIG. 1, the system 100 includes a client device 110, a server device 115, a user device 120, a logging analytics service 130, an event log generation service 150, and a data repository 180. Example client devices 110 and/or user devices 120 include computers, smart phones, processor, or other computing devices. Example server devices 115 include a web server, a database, a cloud computing instance, or the like. The logging analytics service 130 includes various features and attributes for viewing, exploring, or otherwise interactive with or visualizing log event data. The client device 110 and the server device 115 are in electronic communication, and events occurring between the client device 110 and the server device 115 are logged by the logging analytics service 130.

The user device 120 is in electronic communication with the logging analytics service 130 and the event log generation service 150. The event log generation service 150 receives input from the user device 120 to simulate event logs. The user device then accesses analytics for the event logs via the logging analytics service 130. The simulated logs simulate realistic logs such as for events occurring between the client device 110 and the server device 115 that are recorded by the logging analytics service 130.

In FIG. 1, the event log generation service 150 includes an event generator 152, an event log composer 154, a template composer 156, and a schema manager 158. In general, the event generator 152 uses templates and/or schemas to create simulated log events. The event generator 152 applies templates and/or schemas based on various values. The event generator 152 applies static values and/or random variables to event templates according to schemas for the templates. The event generator 152 accesses values for completing event templates and generates one or more events in a sequence. The values are assigned to the static parameters and random parameters of the template according to one or more schemas for the template. In embodiments, the event generator 152 includes modulus for executing schemas such as xml schemas to generate log events and/or log event sequences and/or storing the log events and/or log event sequences in an event log database.

The event log composer 154 includes modules for generating an event log from one or more log events. The event log composer includes modules for generating timelines and/or sequences of events from one or more log events. For example, a sequence of log events includes a sequence of login and logout events for a work schedule associated with an employee. The event log composer 154 generates an event log from a plurality of login sequences generated by the event generator 152 using a plurality of schemas for a login/logout template. The event log composer 154 includes modules for storing the event log and/or making the event log available to a logging analytics service.

The template manager 156 includes modules for generating, accessing, applying, organizing, sorting, and/or providing templates for log events. In various embodiments, organizations have a plurality of roles, client device types, server types, and/or privilege levels associated with events within the system that are logged by the system. For example, a client type, a server type, and/or a client role are determined and a template for the client type, server type, and/or client role is identified and selected for generating the event. In various embodiments, the template is identified for specified parameters that are specified by input received from a user device. In embodiments, template manager stores or sorts templates by an event type such as such as a login attempt, an error, an account creation event, a privilege elevation attempt, start or completion of a task or process, or the like. The system provides one or more schemas for a template that is selected according to a client role. A template is provided for one or more of the following client roles: system administrator, client, customer, user, developer, buyer, seller, information technology, human resources, database administrator, sales, etc. Additional roles are definable corresponding to roles existing within an organization by manual definition and/or by ingesting and analyzing an event log for the organization.

In various embodiments, templates are manually provided to the system to match a structure of an organization. In other embodiments, templates are automatically generated based on analysis of an event log for an organization. In an example, an organization has several roles and several event types that may be logged. The system includes templates for combinations of the several roles and the several event types. For example, an organization includes an employee role and a login event type. The system includes a corresponding template for the role and event type.

The schema manager 158 includes modules for creating, organizing, editing, selecting, and/or otherwise managing schema. In various embodiments, a plurality of schema are selectable and/or usable for a particular template. For example, a plurality of schema are selectable for a template corresponding to an employee role and a login event type. One or more of the pluralities of schema are applied to determine values for the particular template. For example, an event for an employee login is defined by assigning values to the event template for the employee role and login event type.

The schema manager 158 selects a schema for the template based on a variable parameter. In embodiments, the variable parameter is selected from a plurality of variable parameters for the template by a user. A plurality of schemas that correspond to the selected variable parameter are identified and/or presented by the system. The system applies static or randomized values to the template according to one or more of the plurality of schemas. The schema manager 158 identifies and/or selects schema corresponding to a selection or criteria provided by a user.

In embodiments, an integrator provides rules defining a value that is assigned to a variable. For example, an integrator writes code, which is pluggable or modular, that supplies a user identifier for which there is a corresponding operating system user identifier. Using a pattern of events for the operating system user identifier, a template for that user is generated by determining event times, event types, and other event details. As another example, in addition to or instead of user identifiers, an integrator generates plugin code to generate a set of URLs starting with a particular prefix. A template for that set of URLs is generated by determining event times, event types, and other event details. In the example, the template mimics the set of URLs within an organization to facilitate a realistic simulation of network entities in the organization.

Generally, the data repository 180 stores data loaded onto the data repository 180 from the event log generation service 150 and/or another source. In various embodiments, the data repository stores one or more types of data including, but not limited to, user data 182, client data 184, server data 186, role data 188, template data 190, schema data 192, and/or event log data 194.

User data 182, includes information about users of the system, such as user profiles, preferences, interaction histories, and any other data personalized to individual users and/or devices. User data 182 includes template histories, schema use histories, event log histories, etc., generated or used by a particular user of the system.

Client data 184 includes data related to clients participating in log events. For example different clients participate in different log events, such as login, account creation, or privilege elevation, for servers. The client data 184 encompasses data and/or metadata defining attributes of different clients participating in a network, environment, or organization. The data related to the clients is stored in client data 184.

Server data 186 refers to data related to servers participating in different log events, such as login, account creation, or privilege elevation. The server data 186 encompasses data and/or metadata defining attributes of different servers participating in a network, environment, or organization.

Role data 188 encompasses data related to or defining roles of clients and/or servers. For example, when the system logs an event, a data defining the relationship between a client and a server involved in the event is stored as role data 188.

Template data 190 includes data that is manually input into and/or automatically generated by the system 100. In an example, the system provides templates for a default organization including one or more clients, one or more servers, and/or one or more roles. Template data includes definitions for generating events using a set of values input into the template.

Schema data 192 includes data that is manually input into and/or automatically generated by the system 100. In an example, the system provides schemas for a template of a default organization. Schema data includes definitions for determining template values by applying the schema to a set of static and/or random variables.

Event log data 194 includes log event data and/or metadata for log events and/or event logs. In embodiments, log events are stored in an object storage that includes an object definition for an event log. The system stores the log events, event logs, and object definitions as event log data 194.

Examples of operations that may be performed by the system 100 are described below with reference to FIG. 2. As shown, the system 100 is implemented on one or more digital devices. The term "digital device" generally refers to any hardware device that includes a processor. A digital device may refer to a physical device executing an application or a virtual machine. Examples of digital devices include a computer, a tablet, a laptop, a desktop, a netbook, a server, a web server, a network policy server, a proxy server, a generic machine, a function-specific hardware device, a hardware router, a hardware switch, a hardware firewall, a hardware firewall, a hardware network address translator (NAT), a hardware load balancer, a mainframe, a television, a content receiver, a set-top box, a printer, a mobile handset, a smartphone, a personal digital assistant (PDA), a wireless receiver and/or transmitter, a base station, a communication management device, a router, a switch, a controller, an access point, and/or a client device.

In one or more embodiments, an interface refers to hardware and/or software configured to facilitate communication between a user and a system. In FIG. 1, one or more interfaces are used to facilitate communication between the system 100 and/or one or more computing devices. Such an interface renders user interface elements and receives input via user interface elements. Examples of interfaces include a GUI, a command line interface, a haptic interface, and a voice command interface. Examples of user interface elements include checkboxes, radio buttons, dropdown lists, list boxes, buttons, toggles, text fields, date and time selectors, command lines, sliders, pages, and forms.

In various embodiments, different components of such an interface are specified in different languages. The behavior of user interface elements is specified in a dynamic programming language such as JavaScript. The content of user interface elements is specified in a markup language, such as hypertext markup language, extensible markup language, user interface language, or another markup language. The layout of user interface elements is specified in a style sheet language such as cascading style sheets. In embodiments, interfaces are specified in one or more other languages, such as Java, C, C++, or another programming language.

3. Operations for Generating Log Events

Figure 2:
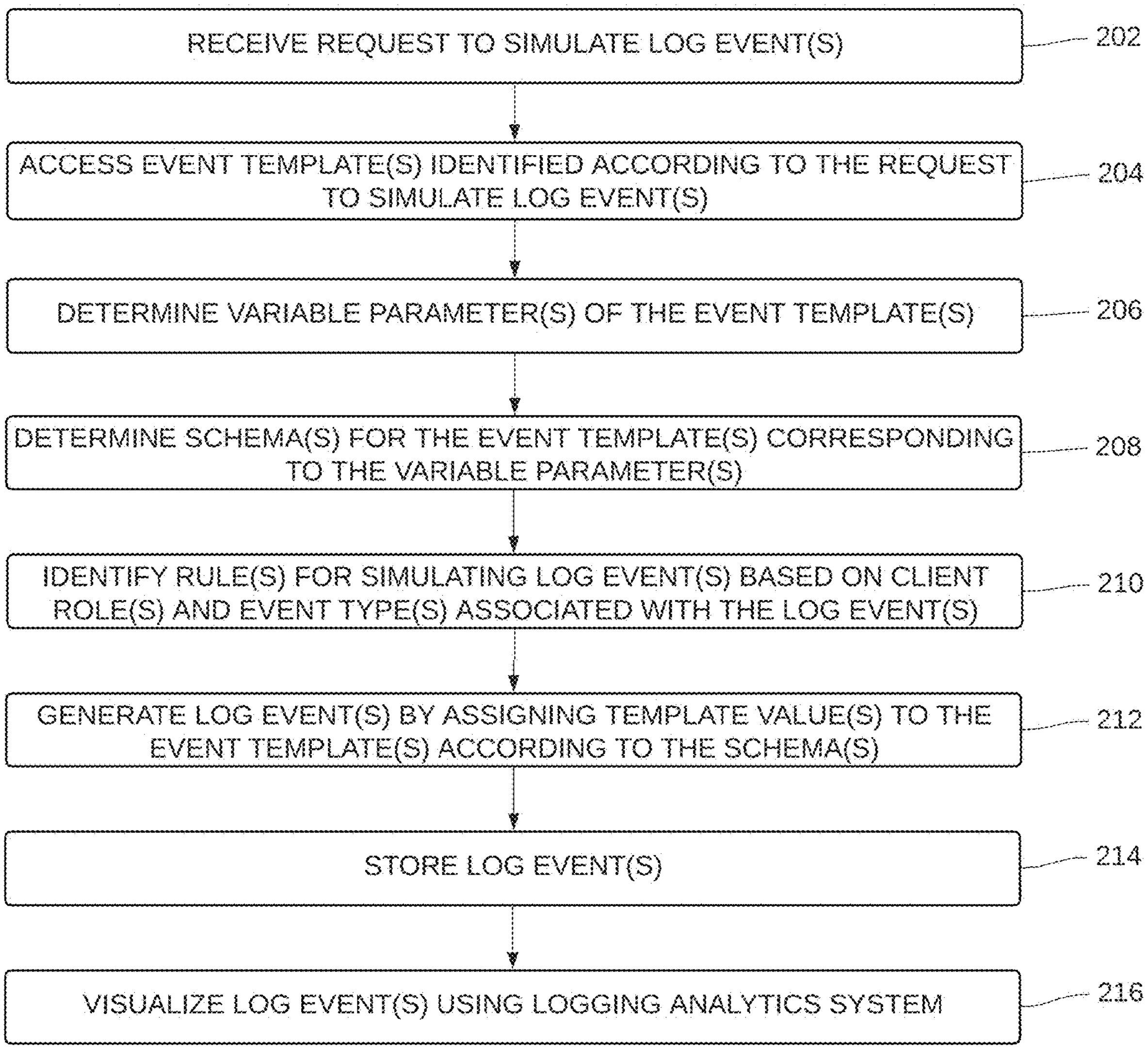
FIG. 2 illustrates an example set of operations for generating log events in accordance with one or more embodiments.

FIG. 2 illustrates example operations for methods for generating log events using an event log generation system (such as event log generation system 100 of FIG. 1). In FIG. 2, the system receives a request to simulate a log event (Operation 202). In an example embodiment, a user accesses a log generation system via a user computing device. The log generation system can be local to the user computing device or hosted via a web service. The log generation system facilitates simulation of realistic simulated log events and/or event logs. In embodiments, the event logs are suitable for ingestion by a logging analytics service and visualization on the user device.

The system accesses one or more event templates identified according to the request to simulate the one or more log events (Operation 204). For example, the system receives an identification of a client role and an event type. Example client roles include an employee, customer, and/or administrator role. Example event types include a login or logout, a request for resource, a privilege elevation attempt, an account creation attempt, or the like. For a particular client role and request type, one or more templates are identified and/or provided by the system. In the case that multiple templates are presented by the system for a client role and/or request type, the system receives a selection of one or more templates according to another event attribute, such as a client subtype, request subtype, time range, geographic location, privilege level, priority level, or the like.

In an embodiment, the system provides a set of templates for one or more client roles and one or more event types that represent an organizational structure for an organization. In various embodiments, an organization includes a plurality of client roles, request types, servers, and/or event types. For a particular selection of one or more client roles and one or more request types, the system presents a corresponding template or set of templates. The system applies a schema according to a variable parameter to generate log events for a client role and/or event type. In embodiments, a template also includes one or more of a timestamp, a server identifier, a server type, a server location, a client device identifier, a process identification number, a geographic location, an IP address, a host name, a domain name, a mapping from the host name to the domain name, group structure, organization structure, one or more labels, one or more Boolean attributes, etc.

The system determines one or more variable parameters of the one or more event templates (Operation 206). In the example, a template includes one or more variable parameters for a client role and event type. Example variable parameters for a template for an employee role and login request event type include a geographic region, a client sub-role or client job, a time range, a date range, a number of allowed unsuccessful attempts allowed for an event, a calendar-based rule for event timing, or another event-related attribute.

In an example embodiment, the variable parameter comprises a time parameter for a client role. In a particular example, for a client role, a variable parameter is a time range for a login time and/or logout time. In embodiments, the time range is adjustable and/or set to a default range from a current time (e.g., a range starting and/or ending within one hour, one day, week, one month, ninety days, a year, five years, or a longer or shorter period of time from a current time). The system generates log events within the time range. For example, the system generates a sequence of login events with sequential timestamps within the time range defined by the variable parameter. In embodiments, a login template for an employee role and login request event type includes a plurality of static parameters and a plurality of variable parameters. The static parameters for a template include the login event type, client identifiers, server identifies, other static values for a particular sequence of events. The one or more variable parameters of various embodiments include parameters such as: a timestamp, a date, a geographic location, client job, request type, server type, server name, privilege level, etc.

In an embodiment, the system generates a sequence of events having delays between events determined by a random time value within a specified time range. The system generates sequences of events with periods of time in between events determined according to a normal distribution or an even distribution within the specified time range (or ranges). In embodiments, sequences that occur with a random delay between events also occur at random start times within particular time ranges. For example, a sequence of simulated log events includes a sequence of events (e.g., with random delays in between) that occur within a morning hour and a sequence of events that occur within an evening hour.

The system determines one or more schemas for the one or more event templates corresponding to the one or more variable parameters (Operation 208). In some embodiments, the system determines one or more schemas according to an indication in the request to simulate the one or more log events. For a particular variable parameter, the system applies one or more schemas selected based on the variable parameter to determine values for the template. For example, for one or more variable parameters, a schema provides instructions defining attributes of an event. A user selects a variable parameter of an event template, and a schema defines the other event attributes, such as timestamp, geographic location, other event related details (e.g., for a login event, the username and password input, whether the login was successful, etc.) that are used as values to complete the event template. In some embodiments, the system requests values to be input into the schema to determine values used for the template and/or schema.

The system identifies one or more rules for simulating the one or more log events based on one or more user roles and one or more event types associated with event template (Operation 210). In various embodiments, the system applies rules for a selected template and one or more selected variable parameters. The rules determine how values are assigned to a selected variable parameter. In embodiments, the rules are included in one or more schema definitions belonging to one or more schemas corresponding to the selected template and the variable parameter. For example, for an employee client role and a login request event type, a rule for simulating the one or more log events provides a low probability of a login event occurring with a timestamp corresponding to a time outside of work hours, and a high probability of a login event occurring at another time, such as the job start time for the employee. More example schema rules for simulating log events are provided in the example techniques below.

The system generates one or more log events by assigning one or more template values to the one or more event templates according to the one or more schemas (Operation 212). The system applies one or more schema definitions to define one or more values that are input into the template. A schema definition defines an unspecified template value using one or more specified values for the event template and one or more schema rules. In various embodiments, rules are based on a holiday calendar, work schedule, client job or sub-role, or other parameters. For a particular event type, parameters specific to that event type are included in some embodiments. The system generates one or more events using the client role and a value for the variable parameter that is defined by the schema and a default and/or input time range.

The system stores the one or more log events (Operation 214). In embodiments, the one or more log events are stored in an event log data object. A log event data object comprises one or more sequences of one or more log events that are stored in an event log specific format, in a generalized format such as an array, or another data structure.

The system visualizes the one or more log events using an LA system (Operation 216). In various embodiments, the one or more log events are organized in a LA event log. The log events are presented on a user device, such as in a graphical or textual list form. The event log is navigable, and attributes of individual log events are visualized using charts, graphs, and the like, by interacting with elements of the visualized event log.

4. Example Log Event Generation System Techniques

Figure 3A:
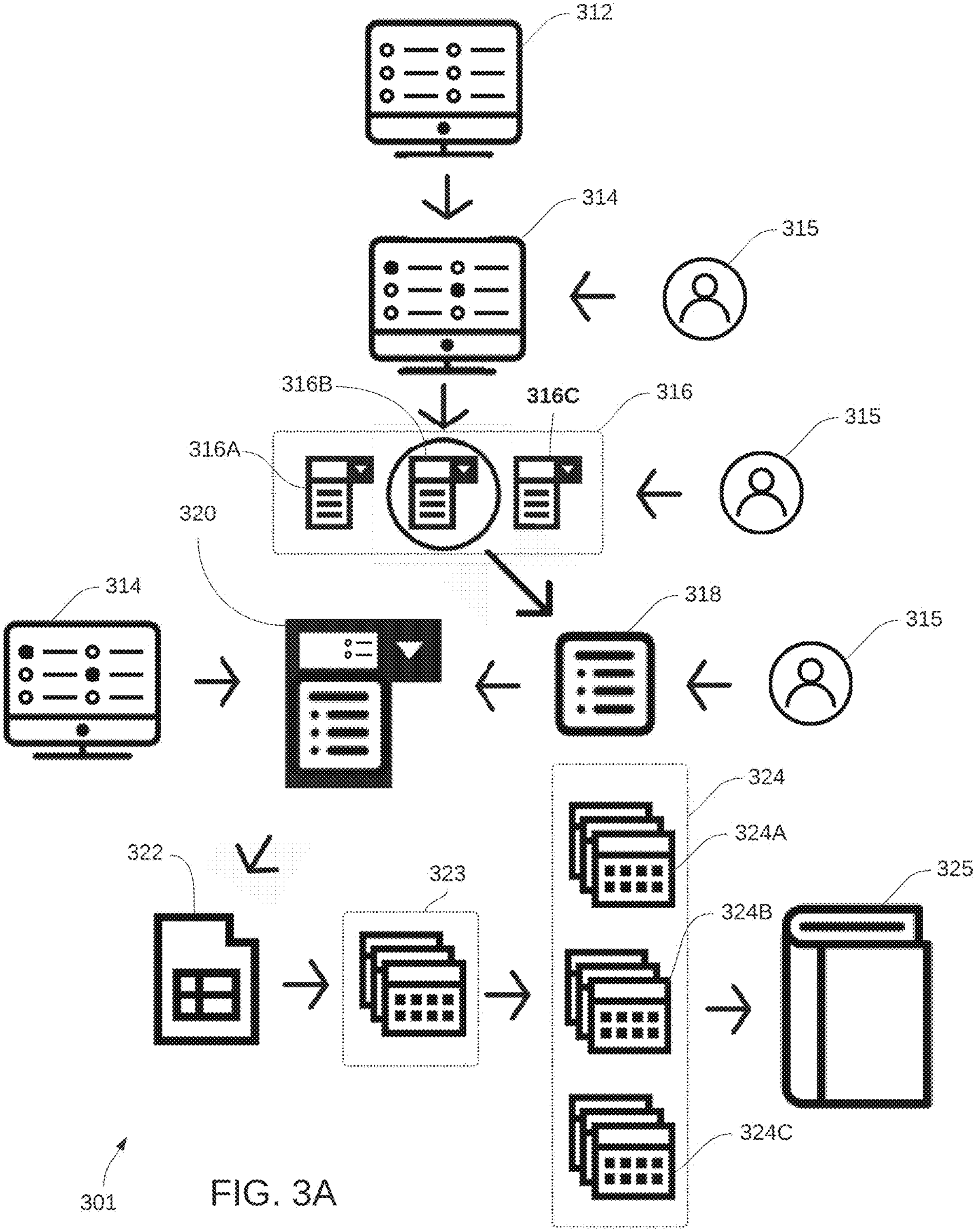
FIG. 3A illustrates operations for generating an event log in accordance with one or more embodiments.
Figure 3B:
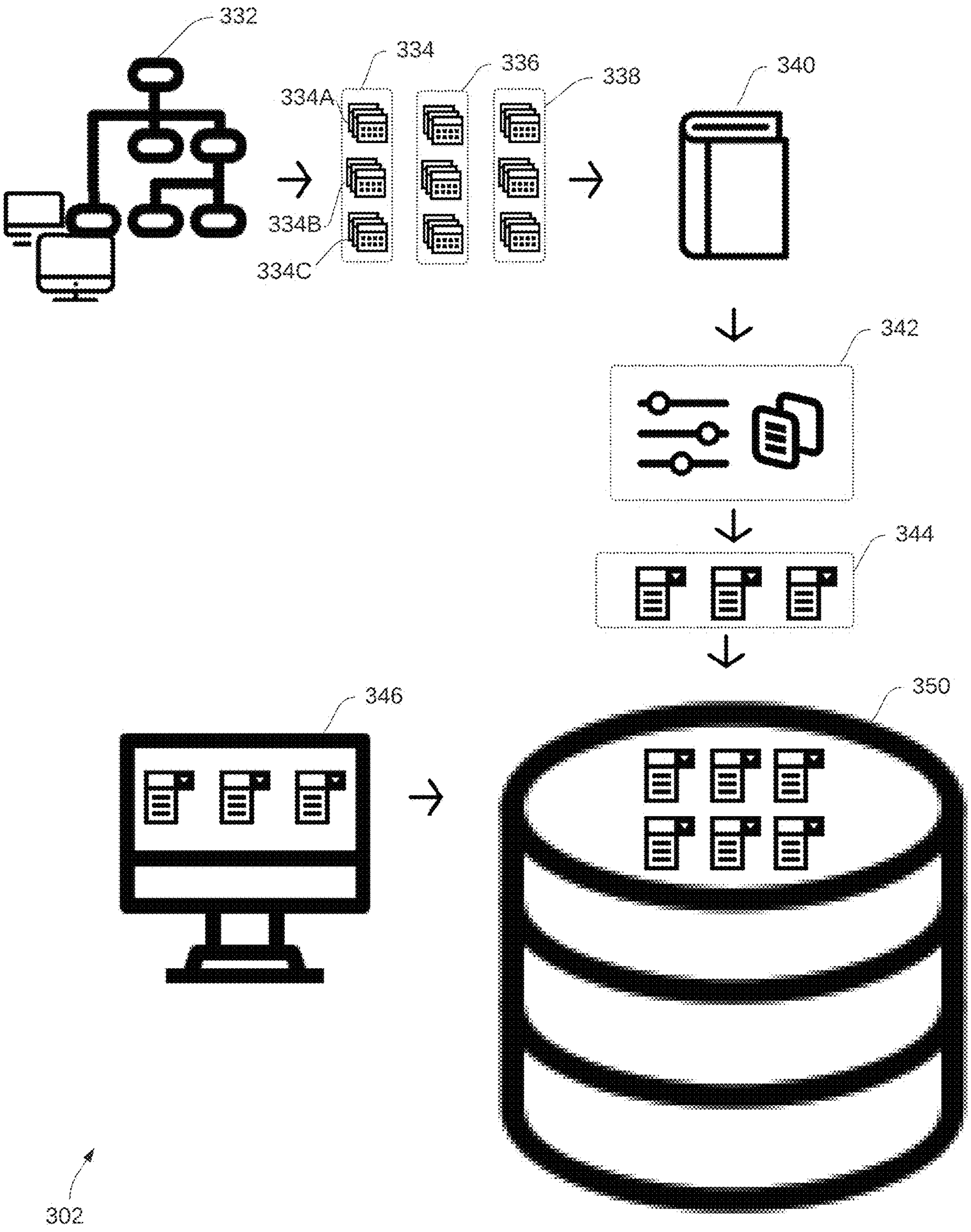
FIG. 3B illustrates operations for extracting and storing log event templates in accordance with one or more embodiments.
Figure 3C:
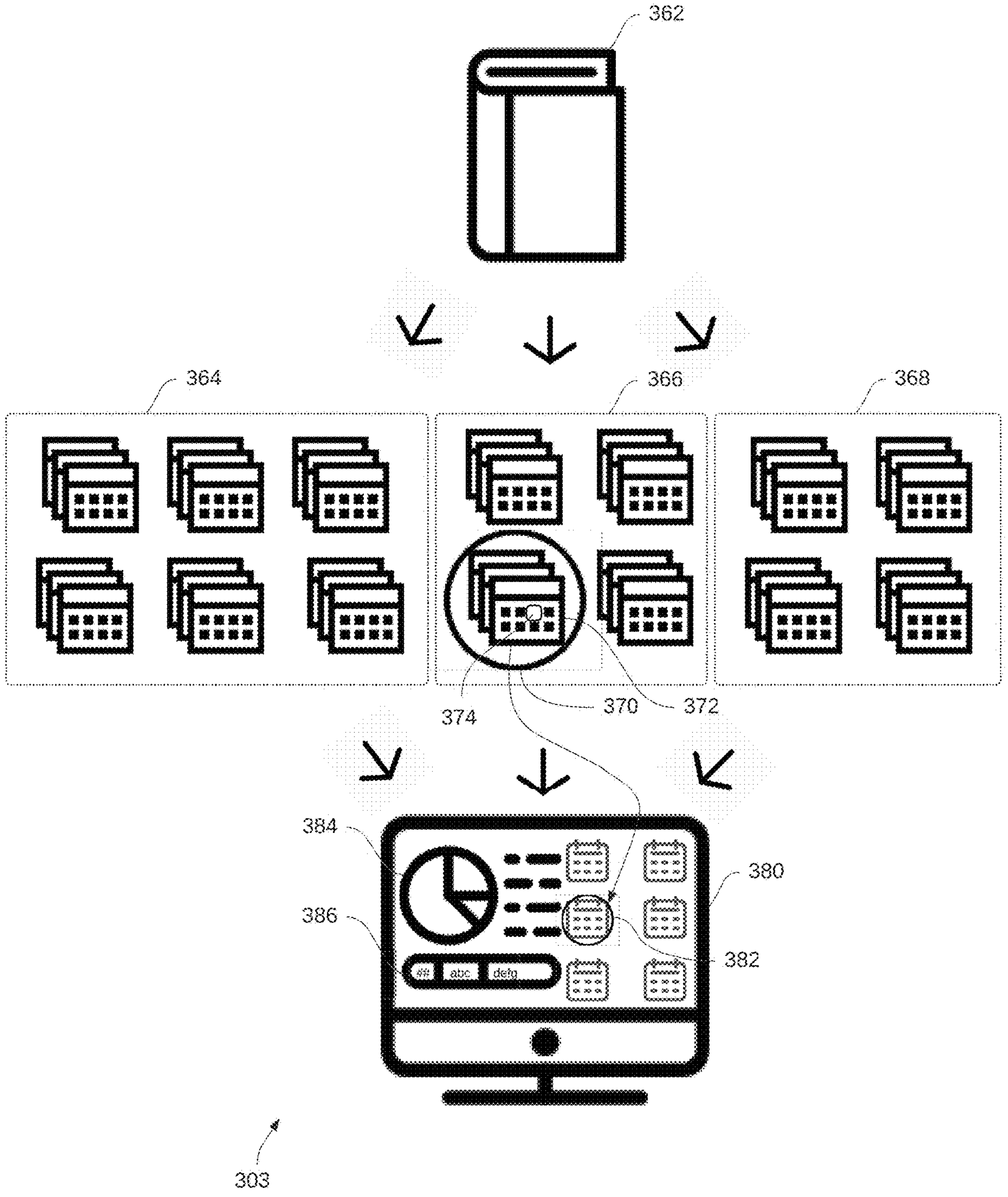
FIG. 3C illustrates operations for visualizing an event log using a logging analytics system.

FIGS. 3A-C illustrate example sets of operations for log event system techniques such as generating an event log, extracting and storing log event templates, and visualizing event logs using a log event generation system.

FIG. 3A illustrates a first set of operations 301 for generating an event log in accordance with one or more embodiments. In FIG. 3A the system presents a user interface 312. The user interface 312 includes selectable features enabling a user to select a client role, an event type, and/or other event attributes. For example, a user specifies a date or time range, geographical location, client role and/or event type. The system receives input from a user device 315, and the selected event attributes are reflected in the updated user interface 314.

Responsive to selection and/or confirmation of event attributes, the system provides plurality of templates 316. The plurality of templates 316 includes a first template 316A, a second template 316B, and a third template 316C. In the example, the system receives input from a user device 315 indicating selection of the second template 316B.

The system accesses a schema 318 for the selected template 316B. The system receives input from the user device 315 for values of the schema. In some embodiments, the system presents a plurality of schemas and receives a selection of one or more schemas of the plurality of schemas. In embodiments, the system requests, receives, and/or confirms a schema and requests, receives, and/or confirms one or more input parameters of the schema. The system receives one or more input values and/or ranges of values from user device 315 to generate a filled event template 320. The filled event template 320 has template values, ranges, or algorithmic instructions for determining values defined according to the one or more schemas, the client role, and the variable parameter.

The system then generates an event 322 by applying the completed template 320 to determine attribute values for the event 322. The template defines the event using the schema rules to determine the event attributes. The system generates one or more sequences 323 of one or more events for a client using a static value for the client identifier of the event. The system generates a set of sequences 324 matching client role and event types occurring within an organization. In the example, the system generates a plurality of events 322 and stores the events 322 as a set of sequences of events 323 using one or more schema and a template. A plurality of different templates and/or a plurality of different schemas are applied to generate an event log for a plurality of client roles within a system. The system stores the sets of sequences of events in an event log 325 which is ingestable by a LA service.

In FIG. 3A, a sequence of events 324A is defined using a schema rule comprising one or more calendar rules and/or time rules. For example, a calendar rule defines allowed days and/or disallowed days for an event type and/or provides a probability of or weighting for an event occurring on a certain day. Example rules include weighing the probability of logins for weekdays, weekends, holiday calendar (including regional holidays determined using location), etc. These rules generate a more realistic log for an employee role and login event type. In various embodiments the rules are manually entered into the system or determined automatically by the system by analyzing event log data. Additionally, the schema login attempt rule schemas include algorithms for determining delays between login events. The algorithms include a likelihood of a logout and login event before the end of a workday, a logout and login event for lunch, a login outside of work hours, a login outside of waking hours, etc. In embodiments, login attempt rules are generated based on a daily, weekly, monthly, or yearly login/logout routine.

In FIG. 3A, a sequence of events 324B is defined using a schema rule for one or more login attempt rules. In various examples, an unsuccessful login attempt probability, limit, or range is defined by a schema rule, such that the schema rule provides a likelihood that a login attempt is unsuccessful and/or a maximum number of login attempts. Login attempt schemas also provide rules for determining what usernames and/or passwords are recorded for an event template.

The login attempt rules also include rules identifying a server based on the client role. For example, a first event is a denied request because the client role for the request is not allowed by a particular server based on the login attempt rules. A second event is allowed because the client role for the request is allowed by a particular server based on the login attempt rules.

In FIG. 3A, a sequence of events 324C is defined using a schema rule for a geographical location rule. For example, in certain locations, employees have work hours, workdays, or holidays which are different from other locations. In various embodiments, geographical location rules interact with the calendar and/or time rules by defining which calendar rules and/or time rules apply based on geographical location. The geographical location is used to determine time zone or national holiday calendar. A schema definition includes a schema rule determining the number and/or attributes of log events generated. A geographic location includes one or more of a city name, a time zone, a country name, a zip code, etc.

The realism of the simulated generated log events is improved by generating the events by applying the schema definitions to determine event template values. The schemas and schema rules mimic events occurring for clients in an organization such that the resulting event log simulates events in a structure matching the organizational structure of an organization as defined by the client role, event type, and/or other parameters defined by the schemas. In some embodiments, a schema rule optionally defines a likelihood of and values for anomalous event to be included in an event log.

FIG. 3B illustrates a second set of operations 302 for extracting and storing log event schemas in accordance with one or more embodiments. In FIG. 3B, an organization 332 includes a plurality of client devices, server devices, and client roles within the organization 332. The organization 332 logs a plurality of event types for the client devices, server devices, and client roles within the organization 332.

In the example, the system generates event data including a first type of event data 334, a second type of event data 336, and a third type of event data 338. The first type of event data 334 includes a first sequence of events 334A, a second sequence of events 334B, and a third sequence of events 334C. The sequences of events 334A, 334B, and 334C, include one or more events for a particular client role, client device, and/or service device. The event data 334, 336, and 338 is stored in an event log 340.

In FIG. 3B, the event log 340 is analyzed by an event ingestor 342. However, in some embodiments, event data is analyzed by event without being stored in an event log. Regardless, the event data is analyzed by the event ingestor 342 to determine one or more templates 344. Further, the event data is analyzed to determine one or more schemas for the templates 344. In some embodiments, templates and/or schemas are edited and/or manually input via an interface of a computing device 348. The determined, edited, and/or manually input templates and/or schemas are stored in a database 350. The templates and corresponding schemas are retrievable from the database 350 for later use according to attributes for the schemas and/or templates.

FIG. 3C illustrates a third set of operations 303 for visualizing an event log. Such event logs are visualized by a logging analytics service (such as logging analytics service 130). In FIG. 3C, an event log 362 includes a first plurality of event sequences 364, a second plurality of event sequences 366, and a third plurality of event sequences 368. In the example, an identified event sequence 370 includes in identified event 372 having an identified attribute 374. The identified event 372 is presented with an identifier in an interface of a user device 380.

In embodiments, the identified event and/or attributes of the identified event are visualized using one or more graphical representations 384 and/or one or more textual representations 386. In various embodiments, a user can input values or ranges for attributes into the system to search for events having attributes with matching values or ranges. Alternatively, the system analyzes event log data automatically to determine events matching one or more criteria. In this way, the system identifies events having certain attributes and/or detects anomalies or outliers in the log event data. In some embodiments, the system automatically identifies anomalous or outlying events and/or event sequences in the user interface of the user device 380. Other events in the event log are also presented and/or explorable.

In some embodiments, actual event logs are presented and comparable against the simulated event logs to determine anomalies in the actual event logs. Additionally, in some embodiments, simulated event logs are combined with actual event logs to supplement the data of the actual event logs where the actual data is incomplete, to generate a more complete event log.

5. Computer Networks and Cloud Networks

In one or more embodiments, a computer network provides connectivity among a set of nodes. The nodes may be local to and/or remote from each other. The nodes are connected by a set of links. Examples of links include a coaxial cable, an unshielded twisted cable, a copper cable, an optical fiber, and a virtual link.

A subset of nodes implements the computer network. Examples of such nodes include a switch, a router, a firewall, and a network address translator ("NAT"). Another subset of nodes uses the computer network. Such nodes (also referred to as "hosts") may execute a client process and/or a server process. A client process makes a request for a computing service (such as, execution of a particular application, and/or storage of a particular amount of data). A server process responds by executing the requested service and/or returning corresponding data.

A computer network may be a physical network, including physical nodes connected by physical links. A physical node is any digital device. A physical node may be a function-specific hardware device, such as a hardware switch, a hardware router, a hardware firewall, and a hardware NAT. Additionally or alternatively, a physical node may be a generic machine that is configured to execute various virtual machines and/or applications performing respective functions. A physical link is a physical medium connecting two or more physical nodes. Examples of links include a coaxial cable, an unshielded twisted cable, a copper cable, and an optical fiber.

A computer network may be an overlay network. An overlay network is a logical network implemented on top of another network (such as, a physical network). Each node in an overlay network corresponds to a respective node in the underlying network. Hence, each node in an overlay network is associated with both an overlay address (to address to the overlay node) and an underlay address (to address the underlay node that implements the overlay node). An overlay node may be a digital device and/or a software process (such as, a virtual machine, an application instance, or a thread) A link that connects overlay nodes is implemented as a tunnel through the underlying network. The overlay nodes at either end of the tunnel treat the underlying multi-hop path between them as a single logical link. Tunneling is performed through encapsulation and decapsulation.

In an embodiment, a client may be local to and/or remote from a computer network. The client may access the computer network over other computer networks, such as a private network or the Internet. The client may communicate requests to the computer network using a communications protocol, such as Hypertext Transfer Protocol (HTTP). The requests are communicated through an interface, such as a client interface (such as a web browser), a program interface, or an application programming interface (API).

In an embodiment, a computer network provides connectivity between clients and network resources. Network resources include hardware and/or software configured to execute server processes. Examples of network resources include a processor, a data storage, a virtual machine, a container, and/or a software application. Network resources are shared amongst multiple clients. Clients request computing services from a computer network independently of each other. Network resources are dynamically assigned to the requests and/or clients on an on-demand basis.

Network resources assigned to each request and/or client may be scaled up or down based on, for example, (a) the computing services requested by a particular client, (b) the aggregated computing services requested by a particular tenant, and/or (c) the aggregated computing services requested of the computer network. Such a computer network may be referred to as a "cloud network."

In an embodiment, a service provider provides a log event generation system via a cloud network to one or more end users. Various service models may be implemented by the cloud network, including but not limited to Software-as-a-Service (SaaS), Platform-as-a-Service (PaaS), and Infrastructure-as-a-Service (IaaS). In SaaS, a service provider provides end users the capability to use the service provider's applications, which are executing on the network resources. In PaaS, the service provider provides end users the capability to deploy custom applications onto the network resources. The custom applications may be created using programming languages, libraries, services, and tools supported by the service provider. In IaaS, the service provider provides end users the capability to provision processing, storage, networks, and other fundamental computing resources provided by the network resources. Any arbitrary applications, including an operating system, may be deployed on the network resources.

In an embodiment, various deployment versions of a log event generation system may be implemented by a computer network, including but not limited to a private cloud, a public cloud, and a hybrid cloud. In a private cloud, network resources are provisioned for exclusive use by a particular group of one or more entities (the term "entity" as used herein refers to a corporation, organization, person, or other entity). The network resources may be local to and/or remote from the premises of the particular group of entities. In a public cloud, cloud resources are provisioned for multiple entities that are independent from each other (also referred to as "tenants" or "customers"). The computer network and the network resources thereof are accessed by clients corresponding to different tenants. Such a computer network may be referred to as a "multi-tenant computer network." Several tenants may use a same particular network resource at different times and/or at the same time. The network resources may be local to and/or remote from the premises of the tenants. In a hybrid cloud, a computer network comprises a private cloud and a public cloud. An interface between the private cloud and the public cloud allows for data and application portability. Data stored at the private cloud and data stored at the public cloud may be exchanged through the interface. Applications implemented at the private cloud and applications implemented at the public cloud may have dependencies on each other. A call from an application at the private cloud to an application at the public cloud (and vice versa) may be executed through the interface.

In an embodiment, tenants of a multi-tenant computer network are independent of each other. For example, a business or operation of one tenant may be separate from a business or operation of another tenant. Different tenants may demand different network requirements for the computer network. Examples of network requirements include processing speed, amount of data storage, security requirements, performance requirements, throughput requirements, latency requirements, resiliency requirements, Quality of Service (QoS) requirements, tenant isolation, and/or consistency. The same computer network may need to implement different network requirements demanded by different tenants.

In one or more embodiments, in a multi-tenant computer network, tenant isolation is implemented to ensure that the applications and/or data of different tenants are not shared with each other. Various tenant isolation approaches may be used.

In an embodiment, each tenant is associated with a tenant ID. Each network resource of the multi-tenant computer network is tagged with a tenant ID. A tenant is permitted access to a particular network resource only if the tenant and the particular network resources are associated with a same tenant ID.

In an embodiment, each tenant is associated with a tenant ID. Each application, implemented by the computer network, is tagged with a tenant ID. Additionally, or alternatively, each data structure and/or dataset, stored by the computer network, is tagged with a tenant ID. A tenant is permitted access to a particular application, data structure, and/or dataset only if the tenant and the particular application, data structure, and/or dataset are associated with a same tenant ID.

As an example, each database implemented by a multi-tenant computer network may be tagged with a tenant ID. Only a tenant associated with the corresponding tenant ID may access data of a particular database. As another example, each entry in a database implemented by a multi-tenant computer network may be tagged with a tenant ID. Only a tenant associated with the corresponding tenant ID may access data of a particular entry. However, the database may be shared by multiple tenants.

In an embodiment, a subscription list indicates which tenants have authorization to access which applications. For each application, a list of tenant IDs of tenants authorized to access the application is stored. A tenant is permitted access to a particular application only if the tenant ID of the tenant is included in the subscription list corresponding to the particular application.

In an embodiment, network resources (such as digital devices, virtual machines, application instances, and threads) corresponding to different tenants are isolated to tenant-specific overlay networks maintained by the multi-tenant computer network. As an example, packets from any source device in a tenant overlay network may only be transmitted to other devices within the same tenant overlay network. Encapsulation tunnels are used to prohibit any transmissions from a source device on a tenant overlay network to devices in other tenant overlay networks. Specifically, the packets, received from the source device, are encapsulated within an outer packet. The outer packet is transmitted from a first encapsulation tunnel endpoint (in communication with the source device in the tenant overlay network) to a second encapsulation tunnel endpoint (in communication with the destination device in the tenant overlay network). The second encapsulation tunnel endpoint decapsulates the outer packet to obtain the original packet transmitted by the source device. The original packet is transmitted from the second encapsulation tunnel endpoint to the destination device in the same particular overlay network.

6. Microservice Applications

According to one or more embodiments, the techniques described herein are implemented in a microservice architecture. A microservice in this context refers to software logic designed to be independently deployable, having endpoints that may be logically coupled to other microservices to build a variety of applications, for example, by logically coupling a log event generation system to a software logic endpoint. Applications built using microservices are distinct from monolithic applications, which are designed as a single fixed unit and generally comprise a single logical executable. With microservice applications, different microservices are independently deployable as separate executables. Microservices may communicate using HyperText Transfer Protocol (HTTP) messages and/or according to other communication protocols via API endpoints. Microservices may be managed and updated separately, written in different languages, and be executed independently from other microservices.

Microservices provide flexibility in managing and building applications. Different applications may be built by connecting different sets of microservices without changing the source code of the microservices. Thus, the microservices act as logical building blocks that may be arranged in a variety of ways to build different applications. Microservices may provide monitoring services that notify a microservices manager (such as If-This-Then-That (IFTTT), Zapier, or Oracle Self-Service Automation (OSSA)) when trigger events from a set of trigger events exposed to the microservices manager occur. Microservices exposed for an application may additionally, or alternatively, provide action services that perform an action in the application (controllable and configurable via the microservices manager by passing in values, connecting the actions to other triggers and/or data passed along from other actions in the microservices manager) based on data received from the microservices manager. The microservice triggers and/or actions may be chained together to form recipes of actions that occur in optionally different applications that are otherwise unaware of or have no control or dependency on each other. These managed applications may be authenticated or plugged in to the microservices manager, for example, with user-supplied application credentials to the manager, without requiring reauthentication each time the managed application is used alone or in combination with other applications.

In one or more embodiments, microservices may be connected via a GUI. For example, microservices may be displayed as logical blocks within a window, frame, other element of a GUI. A user may drag and drop microservices into an area of the GUI used to build an application. The user may connect the output of one microservice into the input of another microservice using directed arrows or any other GUI element. The application builder may run verification tests to confirm that the output and inputs are compatible (e.g., by checking the datatypes, size restrictions, etc.)

Triggers

The techniques described above may be encapsulated into a microservice, according to one or more embodiments. In other words, a microservice may trigger a notification (into the microservices manager for optional use by other plugged in applications, herein referred to as the "target" microservice) based on the above techniques and/or may be represented as a GUI block and connected to one or more other microservices. The trigger condition may include absolute or relative thresholds for values, and/or absolute or relative thresholds for the amount or duration of data to analyze, such that the trigger to the microservices manager occurs whenever a plugged-in microservice application detects that a threshold is crossed. For example, a user may request a trigger into the microservices manager when the microservice application detects a value has crossed a triggering threshold.

In one embodiment, the trigger, when satisfied, might output data for consumption by the target microservice. In another embodiment, the trigger, when satisfied, outputs a binary value indicating the trigger has been satisfied, or outputs the name of the field or other context information for which the trigger condition was satisfied. Additionally or alternatively, the target microservice may be connected to one or more other microservices such that an alert is input to the other microservices. Other microservices may perform responsive actions based on the above techniques, including, but not limited to, deploying additional resources, adjusting system configurations, and/or generating GUIs.

Actions

In one or more embodiments, a plugged-in microservice application may expose actions to the microservices manager. The exposed actions may receive, as input, data or an identification of a data object or location of data, that causes data to be moved into a data cloud.

In one or more embodiments, the exposed actions may receive, as input, a request to increase or decrease existing alert thresholds. The input might identify existing in-application alert thresholds and whether to increase or decrease, or delete the threshold. Additionally, or alternatively, the input might request the microservice application to create new in-application alert thresholds. The in-application alerts may trigger alerts to the user while logged into the application, or may trigger alerts to the user using default or user-selected alert mechanisms available within the microservice application itself, rather than through other applications plugged into the microservices manager.

In one or more embodiments, the microservice application may generate and provide an output based on input that identifies, locates, or provides historical data, and defines the extent or scope of the requested output. The action, when triggered, causes the microservice application to provide, store, or display the output, for example, as a data model or as aggregate data that describes a data model.

7. Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs), field programmable gate arrays (FPGAs), or network processing units (NPUs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, FPGAs, or NPUs with custom programming to accomplish the techniques. The special-purpose computing devices may be desktop computer systems, portable computer systems, handheld devices, networking devices or any other device that incorporates hard-wired and/or program logic to implement the techniques.

Figure 4:
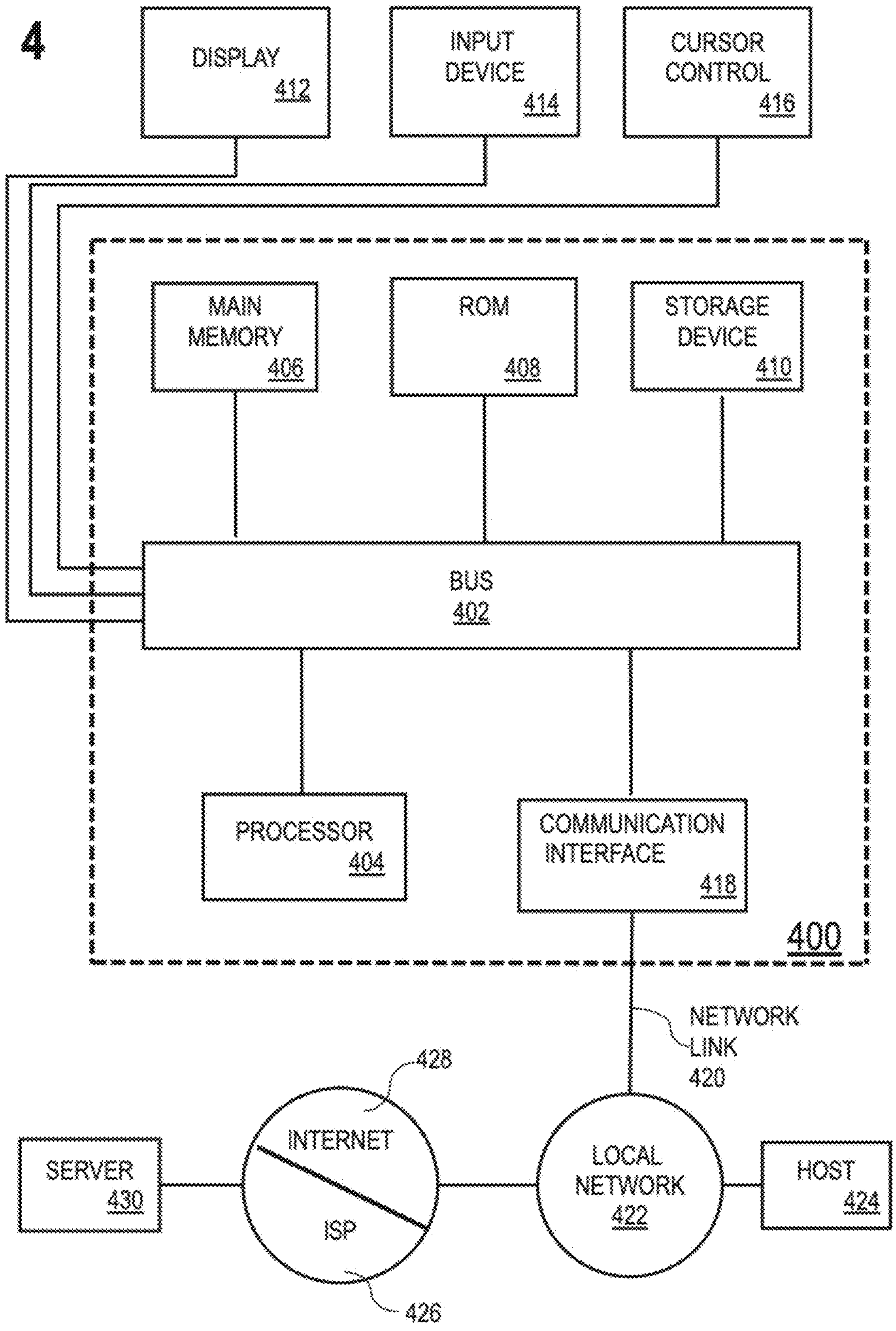
FIG. 4 shows a block diagram that illustrates a computer system in accordance with one or more embodiments.

For example, FIG. 4 is a block diagram that illustrates a computer system 400 upon which an embodiment of the disclosure may be implemented. Computer system 400 includes a bus 402 or other communication mechanism for communicating information, and a hardware processor 404 coupled with bus 402 for processing information. Hardware processor 404 may be, for example, a general purpose microprocessor.

Computer system 400 also includes a main memory 406, such as a random access memory (RAM) or other dynamic storage device, coupled to bus 402 for storing information and instructions to be executed by processor 404. Main memory 406 also may be used for storing temporary variables or other intermediate information during execution of instructions to be executed by processor 404. Such instructions, when stored in non-transitory storage media accessible to processor 404, render computer system 400 into a special-purpose machine that is customized to perform the operations specified in the instructions.

Computer system 400 further includes a read only memory (ROM) 408 or other static storage device coupled to bus 402 for storing static information and instructions for processor 404. A storage device 410, such as a magnetic disk, optical disk, or a Solid State Drive (SSD) is provided and coupled to bus 402 for storing information and instructions.

Computer system 400 may be coupled via bus 402 to a display 412, such as a cathode ray tube (CRT), for displaying information to a computer user. An input device 414, including alphanumeric and other keys, is coupled to bus 402 for communicating information and command selections to processor 404. Another type of user input device is cursor control 416, such as a mouse, a trackball, or cursor direction keys for communicating direction information and command selections to processor 404 and for controlling cursor movement on display 412. This input device typically has two degrees of freedom in two axes, a first axis (e.g., x) and a second axis (e.g., y), that allows the device to specify positions in a plane.

Computer system 400 may implement the techniques described herein using customized hard-wired logic, one or more ASICs or FPGAs, firmware and/or program logic which in combination with the computer system causes or programs computer system 400 to be a special-purpose machine. According to one embodiment, the techniques herein are performed by computer system 400 in response to processor 404 executing one or more sequences of one or more instructions contained in main memory 406. Such instructions may be read into main memory 406 from another storage medium, such as storage device 410. Execution of the sequences of instructions contained in main memory 406 causes processor 404 to perform the process steps described herein. In alternative embodiments, hard-wired circuitry may be used in place of or in combination with software instructions.

The term "storage media" as used herein refers to any non-transitory media that store data and/or instructions that cause a machine to operate in a specific fashion. Such storage media may comprise non-volatile media and/or volatile media. Non-volatile media includes, for example, optical or magnetic disks, such as storage device 410. Volatile media includes dynamic memory, such as main memory 406. Common forms of storage media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge, content-addressable memory (CAM), and ternary content-addressable memory (TCAM).

Storage media is distinct from but may be used in conjunction with transmission media. Transmission media participates in transferring information between storage media. For example, transmission media includes coaxial cables, copper wire and fiber optics, including the wires that comprise bus 402. Transmission media can also take the form of acoustic or light waves, such as those generated during radio-wave and infra-red data communications.

Various forms of media may be involved in carrying one or more sequences of one or more instructions to processor 404 for execution. For example, the instructions may initially be carried on a magnetic disk or solid state drive of a remote computer. The remote computer can load the instructions into its dynamic memory and send the instructions over a telephone line using a modem. A modem local to computer system 400 can receive the data on the telephone line and use an infra-red transmitter to convert the data to an infra-red signal. An infra-red detector can receive the data carried in the infra-red signal and appropriate circuitry can place the data on bus 402. Bus 402 carries the data to main memory 406, from which processor 404 retrieves and executes the instructions. The instructions received by main memory 406 may optionally be stored on storage device 410 either before or after execution by processor 404.

Computer system 400 also includes a communication interface 418 coupled to bus 402. Communication interface 418 provides a two-way data communication coupling to a network link 420 that is connected to a local network 422. For example, communication interface 418 may be an integrated services digital network (ISDN) card, cable modem, satellite modem, or a modem to provide a data communication connection to a corresponding type of telephone line. As another example, communication interface 418 may be a local area network (LAN) card to provide a data communication connection to a compatible LAN. Wireless links may also be implemented. In any such implementation, communication interface 418 sends and receives electrical, electromagnetic or optical signals that carry digital data streams representing various types of information.

Network link 420 typically provides data communication through one or more networks to other data devices. For example, network link 420 may provide a connection through local network 422 to a host computer 424 or to data equipment operated by an Internet Service Provider (ISP) 426. ISP 426 in turn provides data communication services through the world wide packet data communication network now commonly referred to as the "Internet" 428. Local network 422 and Internet 428 both use electrical, electromagnetic or optical signals that carry digital data streams. The signals through the various networks and the signals on network link 420 and through communication interface 418, which carry the digital data to and from computer system 400, are example forms of transmission media.

Computer system 400 can send messages and receive data, including program code, through the network(s), network link 420 and communication interface 418. In the Internet example, a server 430 might transmit a requested code for an application program through Internet 428, ISP 426, local network 422 and communication interface 418.

The received code may be executed by processor 404 as it is received, and/or stored in storage device 410, or other non-volatile storage for later execution.

8. Miscellaneous; Extensions

Unless otherwise defined, all terms (including technical and scientific terms) are to be given their ordinary and customary meaning to a person of ordinary skill in the art, and are not to be limited to a special or customized meaning unless expressly so defined herein.

This application may include references to certain trademarks. Although the use of trademarks is permissible in patent applications, the proprietary nature of the marks should be respected and every effort made to prevent their use in any manner which might adversely affect their validity as trademarks.

Embodiments are directed to a system with one or more devices that include a hardware processor and that are configured to perform any of the operations described herein and/or recited in any of the claims below.

In an embodiment, one or more non-transitory computer readable storage media comprises instructions which, when executed by one or more hardware processors, cause performance of any of the operations described herein and/or recited in any of the claims.

In an embodiment, a method comprises operations described herein and/or recited in any of the claims, the method being executed by at least one device including a hardware processor.

Any combination of the features and functionalities described herein may be used in accordance with one or more embodiments. In the foregoing specification, embodiments have been described with reference to numerous specific details that may vary from implementation to implementation. The specification and drawings are, accordingly, to be regarded in an illustrative rather than a restrictive sense. The sole and exclusive indicator of the scope of the disclosure, and what is intended by the applicants to be the scope of the disclosure, is the literal and equivalent scope of the set of claims that issue from this application, in the specific form in which such claims issue, including any subsequent correction.

What is claimed is:

1. A method for generating log events, comprising:
- receiving a request to simulate a log event;
- responsive to receiving the request, accessing a log event template;
- determining a variable parameter of the log event template;
- determining a schema for the log event template corresponding to the variable parameter, wherein the schema (i) defines one or more rules for generating one or more values assigned to the log event template, (ii) identifies one or more rules for simulating the log event based on a client role associated with the log event template, (iii) is selected based on the client role, and (iv) governs generation of the log event consistent with behavior associated with the client role;
- generating a simulated log event by assigning a template value to the log event template according to the schema; and
- storing the simulated log event;
- wherein the method is performed by at least one device including a hardware processor.

2. The method of claim 1, comprising:
- generating a plurality of simulated log events based on generating a plurality of template values for the variable parameter; and
- storing the plurality of simulated log events in an analytics log.

3. The method of claim 1, comprising:
- generating the simulated log event based on generating a plurality of values for a plurality of variable parameters according to the log event template.

4. The method of claim 1, wherein:
- the schema comprises a plurality of static parameters and a plurality of variable parameters, the plurality of variable parameters being randomized.

5. The method of claim 1, further comprising:
- assigning a plurality of values for a plurality of variable parameters according to the schema, the schema having a schema definition comprising a set of static values and a set of variable values and a weighting of values; and
- assigning the plurality of values according to the weighting of values.

6. The method of claim 1, further comprising:
- determining the schema by analyzing an event log based on the variable parameter, the schema defining the template value for the log event template.

7. The method of claim 1, wherein the log event template includes a client definition, a server definition, an event type, or a time parameter.

8. The method of claim 7, wherein the client definition includes the client role, a client source, and a client identifier, and a privilege level.

9. The method of claim 7, wherein the server definition defines a local area network, a cloud server, a data center, an application programming interface, a web service, or an organization.

10. The method of claim 7, wherein the event type comprises a login attempt, an account creation attempt, or a privilege elevation attempt.

11. The method of claim 7, wherein the time parameter is weighted by a daily schedule, a weekly calendar, a holiday calendar, a regional calendar, or a client event history.

12. The method of claim 1, further comprising:
- storing the simulated log event in an analytics log in an object storage; and
- uploading the analytics log from the object storage to a logging analytics service via a rest application programing interface (API) of the logging analytics service.

13. The method of claim 12, further comprising:
- generating an interface within the logging analytics service based on the analytics log, the interface including a representation of the simulated log event.

14. The method of claim 1, further comprising:
- storing the simulated log event in an event log;
- providing the event log as training data to a machine learning model; and
- training the machine learning model, using the training data, to identify schemas corresponding to event logs.

15. The method of claim 1, further comprising:
- providing one or more values to a machine learning model to generate one or more simulated log events; and
- storing the simulated log event and the one or more simulated log events in an event log.

16. One or more non-transitory computer readable media comprising instructions which, when executed by one or more hardware processors, cause performance of operations comprising:
- receiving a request to simulate a log event;
- responsive to receiving the request, accessing a log event template;
- determining a variable parameter of the log event template;
- determining a schema for the log event template corresponding to the variable parameter, wherein the schema (i) defines one or more rules for generating one or more values assigned to the log event template, (ii) identifies one or more rules for simulating the log event based on a client role associated with the log event template, (iii) is selected based on the client role, and (iv) governs generation of the log event consistent with behavior associated with the client role;
- generating a simulated log event by assigning a template value to the log event template according to the schema; and
- storing the simulated log event.

17. The non-transitory computer readable media of claim 16, wherein the instructions further cause performance of operations comprising:
- generating a plurality of simulated log events based on generating a plurality of template values for the variable parameter; and
- storing the plurality of simulated log events in an analytics log.

18. The non-transitory computer readable media of claim 16, wherein the instructions further cause performance of operations comprising:
- assigning a plurality of values for a plurality of variable parameters according to the schema, the schema having a schema definition comprising a set of static values and a set of variable values and a weighting of values; and assigning the plurality of values according to the weighting of values.

19. The non-transitory computer readable media of claim 16, wherein the instructions further cause performance of operations comprising:

storing the simulated log event in an event log;

providing the event log as training data to a machine learning model;

training the machine learning model, using the training data, to identify schemas corresponding to event logs;

providing one or more values to the machine learning model to generate one or more simulated log events; and the one or more simulated log events in the event log.

20. A system, comprising:

at least one device including a hardware processor, the system being configured to perform operations comprising:

receiving a request to simulate a log event;

responsive to receiving the request, accessing a log event template;

determining a variable parameter of the log event template;

determining a schema for the log event template corresponding to the variable parameter, wherein the schema (i) defines one or more rules for generating one or more values assigned to the log event template, (ii) identifies one or more rules for simulating the log event based on a client role associated with the log event template, (iii) is selected based on the client role, and (iv) governs generation of the log event consistent with behavior associated with the client role;

generating simulated log event by assigning a template value to the log event template according to the schema; and storing the simulated log event.

* * * * *